No. 640,066. Patented Dec. 26, 1899.
W. W. WYTHE.
ACETYLENE GAS GENERATOR.
(Application filed Mar. 20, 1899.)
(No Model.) 2 Sheets—Sheet 1.
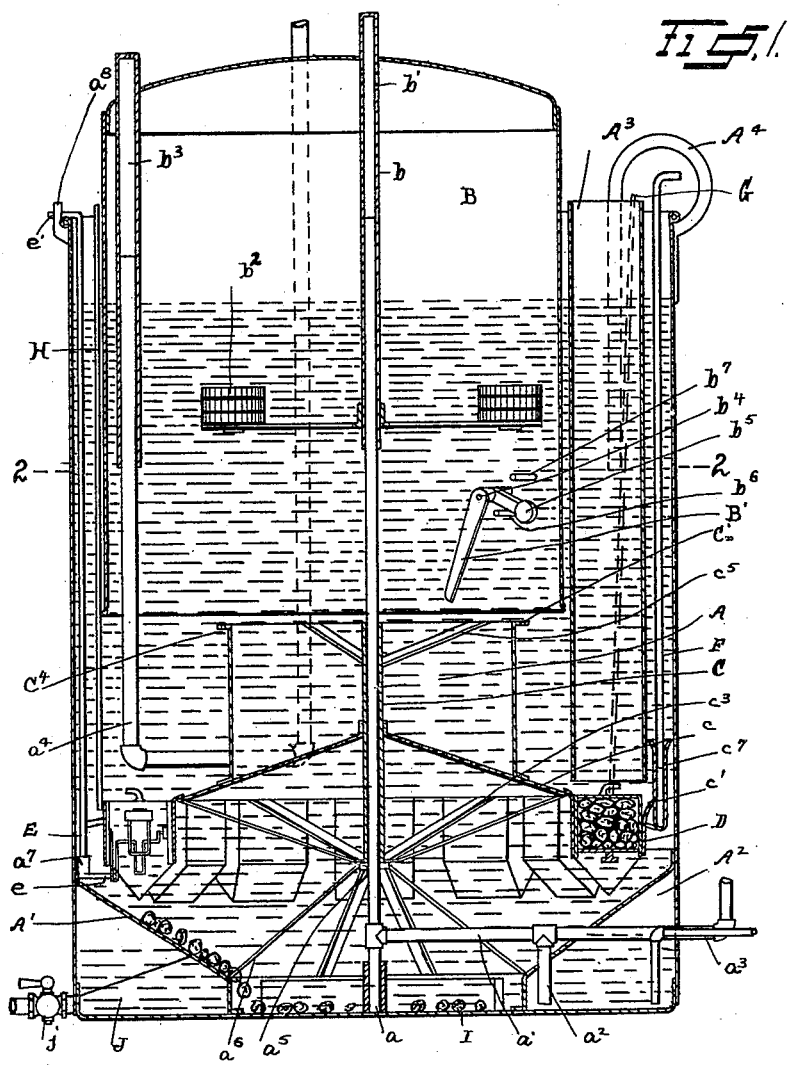
WITNESSES:
INVENTOR
William W. Wythe
BY
ATTORNEY.

No. 640,066. Patented Dec. 26, 1899.
W. W. WYTHE.
ACETYLENE GAS GENERATOR.
(Application filed Mar. 20, 1899.)
(No Model.) 2 Sheets—Sheet 2.
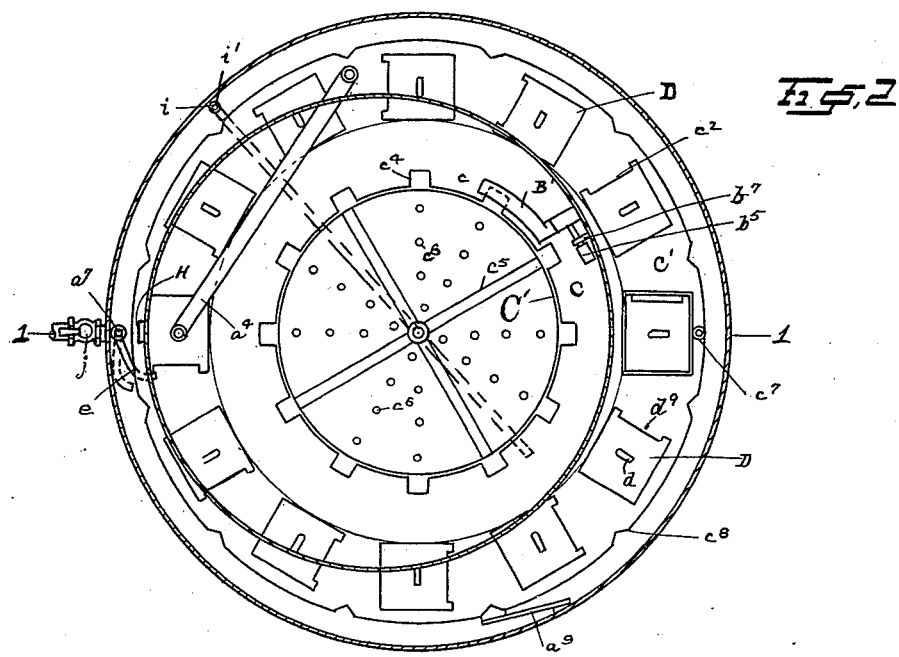
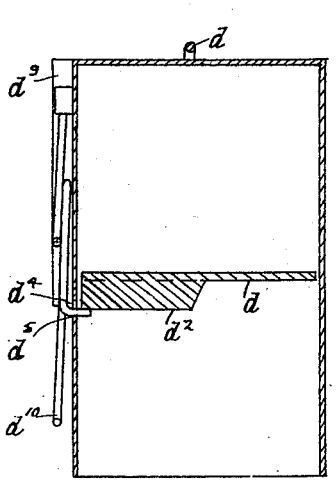
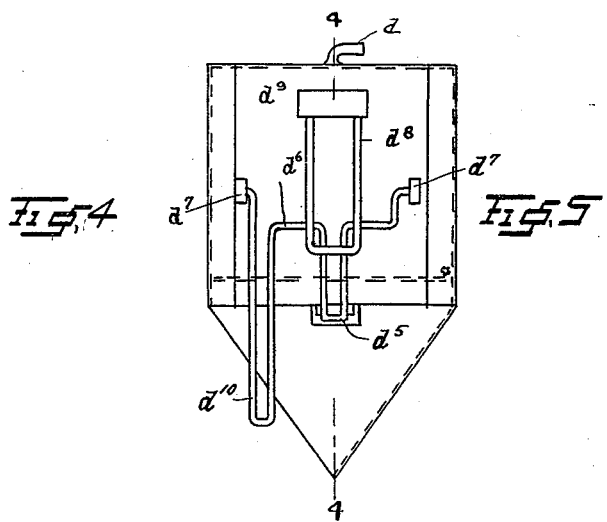
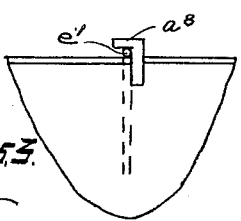
WITNESSES:
INVENTOR
William W. Wythe
BY
ATTORNEY.

UNITED STATES PATENT OFFICE.

WILLIAM W. WYTHE, OF MILES GROVE, PENNSYLVANIA.

ACETYLENE-GAS GENERATOR.

SPECIFICATION forming part of Letters Patent No. 640,066, dated December 26, 1899.

Application filed March 20, 1899. Serial No. 709,755. (No model.)

*To all whom it may concern:*

Be it known that I, WILLIAM W. WYTHE, a citizen of the United States, residing at Miles Grove, in the county of Erie and State of Pennsylvania, have invented certain new and useful Improvements in Acetylene-Generators; and I do hereby declare the following to be a full, clear, and exact description of the invention, such as will enable others skilled in the art to which it appertains to make and use the same.

This invention relates to acetylene-generators; and it consists in certain improvements in the construction thereof, as will be hereinafter fully described, and pointed out in the claims.

The invention is illustrated in the accompanying drawings as follows:

Figure 1 shows a section on the lines 1 1 in Fig. 2. Fig. 2 shows a section on the lines 2 2 in Fig. 1. Fig. 3 shows a fragment of the side of the tank. Fig. 4 shows a section on the lines 4 4 in Fig. 5; Fig. 5, a side elevation of one of the carbid-receptacles.

A marks the water-tank, and B the gas-holder, which is of the usual inverted-cup shape and is sealed by the water in the tank A. A pipe $a$ is secured to the bottom of the tank A and extends upwardly and forms the exit-pipe from the gas-holder. A pipe $b$ is carried by the gas-holder and fits over and slides upon the pipe $a$, so that the pipe $a$ forms a guide for the gas-holder. An opening $b'$ in the pipe $b$ makes a passage from the gas-holder to the pipe $b$. The pipe $a'$ leads from the pipe $a$ out through the tank. Around the outer edge of the bottom of the tank is formed an annular tank $A^2$ by means of an annular partition $A'$, the said partition also forming a hopper-bottom in the tank A. A pipe $a^2$ leads from the pipe $a'$ into the tank $A^2$ and carries with it the drip from the pipe $a$. A drip-pipe $a^3$ leads from the chamber $A^2$ and carries away the surplus of water which accumulates in the chamber $A^2$. A pipe $a^4$ is secured in the tank A and extends upwardly within the holder B. The pipe $b^3$ is carried by the holder B and fits and slides upon the pipe $a^4$. The length of the pipe $b^3$ is such that when the holder reaches the desired limit of upward movement the bottom of said pipe is raised above the level of the water in the tank A, and thus allows the gas to escape through the pipes $b^3$ and $a^4$ to the atmosphere. Weights $b^2$ are arranged on the pipe $b$ and may be varied, as desired, to effect a change in the pressure produced by the gas-holder. A sleeve C is journaled on the pipe $a$ and is supported by a collar $a^5$, which is supported by braces $a^6$. The sleeve C has extending from it a plate $c$, preferably somewhat inclined in order to give it greater strength. This plate has a flat rim $c'$, in which are openings $c^2$. Braces $c^3$ extend from the sleeve C to the plate $c$ for strengthening it. Carbid-receptacles D are lowered through a spout $A^3$ by means of hooked rods G (shown in dash lines) into the openings $c^2$, which are arranged to catch and support said receptacles. The spout or guide $A^3$ is supported at the side of the tank from brackets $A^4$. The receptacles D are box-shaped, having a hook $d$ at the top for lowering them into place. A door $d'$ hinged in the lower side thereof has the projection $d^2$ on the under side thereof, on which a catch $d^5$ is arranged to operate to lock the door in its upper position. The catch $d^5$ is arranged from a wire $d^6$, which is pivoted in the ears $d^7$ on the receptacle D. A spring $d^8$, secured to the side of the receptacle, tends to press the catch $d^5$ into engagement. The catch mechanism is placed in the depression $d^9$ in the side of the receptacle, so that it will not interfere with the ready insertion of the receptacle into the openings $c^2$ in the rim $c'$ of the plate $c$. The receptacle is made air-tight, so that the air which is in the receptacle when it is lowered into the tank is imprisoned in the receptacle. The door is placed a sufficient distance above the bottom to hold the carbid in the receptacle above the water-level, which will be somewhat above the bottom of the receptacle by reason of the compression of the air which is imprisoned in the receptacle. Extending from the wire $d^6$ is an arm $d^{10}$, and arranged in a socket $a^7$ is a lever E with an arm $e$, which extends into the path of the arm $d^{10}$ as the carrier, with the carbid-receptacle, is rotated on the sleeve C, so that as each receptacle reaches the arm $e$ the catch $d^5$ is tripped by reason of the contact of the arm $d^{10}$ with the arm $e$, and this allows the door to open and precipitates the carbid into the tank. This is followed by an immediate formation of acetylene from the entire quantity of carbid which was contained in the receptacle. The plate $c$ has perforations $c^6$ to allow the upward passage of gas. The rod E has a hook $e'$ at its upper end, which is arranged to pass under a hook $a^8$ on the side of the tank A when the arm $e$ is thrown into position to trip the catch mechanism. When the arm $e'$ is thrown out from under the hook $a^8$, the lever E may removed, if desired. When it is desired to recharge the device, the arm $e'$ is turned to throw the arm $e$ out of the path of the arm $d^{10}$, and a lever F (the lever E may be adapted to this purpose) is run down into the tank into a socket $c^7$, which is secured on the rim of the plate $c$ far enough out from the center to allow the inserted rod F to swing around the outside of the gas-holder B. As the receptacles are refilled they may be lowered into the openings $c^2$ and the carrier moved around to bring each successive opening under the spout $A^3$ by means of the rod F and socket $c^7$. Notches $c^3$ are placed on the edge of the plate $c$, into which the detent $a^9$ operates. This device facilitates bringing the openings $c^2$ into register with the guide $A^3$. A bar H is carried by the plate $c$ and revolves with this plate, so that the number of receptacles which have been emptied may be readily ascertained at any time by the position of this rod. When the device has been recharged, the arm $e$ is turned around into the path of the arm $d^{10}$, so that as each receptacle reaches this position it is emptied through the operation of the catch mechanism.

In order that the movement of the carrier may be automatically effected through the movement of the gas-holder to feed forward a fresh receptacle of carbid when the gas in the holder has been exhausted, I provide the following mechanism. Extending upwardly from the plate $c$ is a cylinder $C'$, having outturned teeth $c^4$ at the upper edge thereof. Braces $C^5$ extend from the top of the cylinder to the sleeve C. A pawl $B'$ is journaled on a pin $b^4$ and secured to the side of the gas-holder. A weight $B^5$ holds the pawl $B'$ normally in an inclined position, as shown in Fig. 1. The movement of the weight and pawl is limited by the pin $b^6$ in one direction and by the pin $b^7$ in the opposite direction. The slant and length of the pawl are such as (shown in Fig. 2) to engage one of the teeth or projections $c^4$ as the gas-holder moves downwardly by said projection and to move the engaged tooth and cylinder $C'$ and plate $c$ the distance of one tooth. There are as many teeth on the cylinder $C'$ as there are openings in the plate $c$, so that as the gas-holder reaches its lower limit the plate $c$ has been given a movement sufficient to bring a fresh receptacle into engagement with the arm $e$, so as to empty said receptacle. This of course results in the production of acetylene. The receptacles are so proportioned as to hold just enough carbid to produce a quantity of gas which will approximately fill the gas-holder.

In the bottom of the tank I have placed a spider I, which is journaled on the lower end of the pipe $a$ and may be operated by a rod $i$, which is inserted in a socket $i'$ on one arm of the spider. A passage J is provided from the bottom of the tank, on which is a cock $j$. By operating the rod $i$ the refuse in the bottom of the tank may be stirred up and can then be drawn off through the passage J and the cock $j$.

What I claim as new is—

1. In an acetylene-generator, the combination of a water-tank; a gas-holder; a carbid-receptacle immersed in water and arranged to retain the carbid out of contact with the water; and means actuated by the movement of the holder for transferring carbid from the receptacle to the water.

2. In an acetylene-generator, the combination of a tank; a gas-holder; a series of carbid-receptacles immersed in water and arranged to sustain carbid out of contact with the water; and means actuated by the movement of the holder for emptying said receptacles successively into the water of the tank.

3. In an acetylene-generator, the combination of a tank; a gas-holder; a carbid-receptacle formed in such proportion to the gas-holder as to hold a charge of carbid to produce gas to approximately fill said gas-holder, said receptacle being immersed in water and arranged to sustain said carbid out of contact with the water; and means actuated by the movement of the holder for emptying said receptacle when the volume of gas in the holder is reduced to a predetermined point.

4. In an acetylene-generator, the combination of a tank; a gas-holder; a series of carbid-receptacles formed in such proportion to said holder as to hold a charge of carbid which will approximately fill said holder, said receptacles being immersed in the water in said tank, and arranged to sustain carbid out of contact with the water of said tank; and means actuated by the holder for emptying said receptacles as the volume of gas in the holders is reduced to a predetermined point.

5. In an acetylene-generator, the combination of a tank; a gas-holder; a carrier moved by the action of the gas-holder; carbid-receptacles carried by said carrier in an immersed position; and means actuated by said holder for emptying said receptacles at a certain point in the movement of said carrier.

6. In an acetylene-generator, the combination of a tank; a gas-holder; a carrier moved by the action of the gas-holder; carbid-receptacles carried in an immersed position by said carrier; means actuated by the movement of said holder for moving said carrier; and means for emptying the receptacles carried by said carrier at a certain point in the movement of said carrier.

7. In an acetylene-generator, the combination of a tank; a gas-holder; a rotary carrier moved by the action of the gas-holder; carbid-receptacles carried in an immersed position by said carrier; means actuated by the movement of said holder for moving said carrier; and means for emptying the receptacles carried by said carrier at a certain point in the movement of said carrier.

8. In an acetylene-generator, the combination with the tank; of an air-tight carbid-receptacle arranged in the water of said tank in an inverted position, said receptacle having a means of support at the bottom for supporting carbid out of contact with the water of said tank.

9. In an acetylene-generator, the combination of a tank; a gas-holder; an air-tight receptacle arranged in the water of said tank in an inverted position, said receptacle having means in the bottom for sustaining carbid out of contact with the water of said tank; and means actuated by the movement of the holder for tripping said sustaining means in the receptacle.

10. In an acetylene-generator, the combination of a tank; a gas-holder; a carrier; an air-tight carbid-receptacle arranged on said carrier in an inverted position in the water, said receptacle having means in the bottom thereof for sustaining carbid out of contact with the water of said tank; and means for tripping said sustaining means at a predetermined point in the movement of said carrier.

11. In an acetylene-generator, the combination of a tank; a gas-holder arranged in the tank; a carrier arranged beneath the gas-holder, said carrier being arranged to convey a carbid-receptacle from a position outside of the gas-holder to a position beneath the gas-holder.

12. In an acetylene-generator, the combination of a tank; a gas-holder arranged eccentrically in the tank; a carrier arranged beneath the gas-holder, said carrier being arranged to convey a carbid-receptacle from a position outside of the gas-holder to a position beneath the gas-holder.

13. In an acetylene-generator, the combination of the tank, A; holder, B, placed eccentrically to the tank, A; a carrier journaled beneath the holder, the axis of said carrier being eccentric to the gas-holder; receptacles for carbid arranged in said carrier; means actuated by the movement of said gas-holder for effecting a forward movement of said carrier; and mechanism for emptying the contents of said receptacle at a certain point in the movement of said carrier.

14. In an acetylene-generator, the combination of a tank; a gas-holder placed eccentrically to said tank; a carrier arranged to convey carbid-receptacles from outside of said holder to a position beneath said holder; and a guide, $A^8$, extending down into said tank outside of said holder, said spout being arranged to come into register with certain parts of the carrier for the purposes described.

15. In a carbid-receptacle for an acetylene-generator, the combination of the air-tight case; a door placed in said case at a distance from the edge along one side thereof for the purposes described.

16. In a carbid-receptacle for an acetylene-generator, the combination of the air-tight case; a door placed in said case at a distance from the edge along one side thereof; a catch device for holding said door shut; and a trip for disengaging said catch device.

17. In a carbid-receptacle for an acetylene-generator, the combination of the case; the door, $d'$; the catch, $d^5$; a spring for actuating said catch; the arm, $d^{10}$.

18. In a carbid-receptacle for an acetylene-generator the combination of the case having a depression, $d^9$, in one side; a door arranged in one side of said case; a catch arranged in the depression, $d^9$, for engaging the door and holding it in its closed position.

19. In an acetylene-generator, the combination of the tank; a gas-holder; a rotary carrier having the projections, $c^4$, thereon; and a ratchet mechanism carried by the gas-holder for moving the carrier forward with each reciprocation of the gas-holder.

20. In an acetylene-generator, the combination of the tank, A; the holder, B; the pipes, $a$ and $a'$; the pipes, $b$, on the gas-holder arranged to fit and slide upon the pipe, $a$; the rotary carrier journaled on the pipe, $a$, said carrier having a series of openings for carbid-receptacles and similar series of projections; a ratchet device carried by the gas-holder for operating upon said projections with each reciprocation of the gas-holder to produce a movement of said carrier from projection to projection; inverted air-tight carbid-receptacles in said openings in said carrier, said receptacles being provided with a door in the bottom for sustaining carbid out of contact with the water of the tank; a catch device for sustaining said door; a trip device for disengaging said catch; a rod extending out of said tank and supporting an arm adapted to be moved into and out of the path of said trip device; a spider formation, I, in the bottom of said tank; a rod run from said spider to without the tank; an exhaust-passage leading from the bottom of the tank; a guide, $A^3$, leading down from the top of the tank to the rotary carrier; and a support, $A^4$, for said guide.

In testimony whereof I affix my signature in presence of two witnesses.

WILLIAM W. WYTHE.

Witnesses:
 M. BURY,
 H. C. LORD.